US012637333B2

(12) United States Patent
Handy et al.

(10) Patent No.: US 12,637,333 B2
(45) Date of Patent: May 26, 2026

(54) AIRCRAFT MOUNTED CARGO LIFTING CRANE AND ADAPTER FOR MOUNTING THE SAME

(71) Applicant: Government of the United States, as represented by the Secretary of the Air Force, Wright-Patterson AFB, OH (US)

(72) Inventors: Christopher Handy, Alexandria, VA (US); Jared Minter, Annapolis, MD (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 251 days.

(21) Appl. No.: 18/386,796

(22) Filed: Nov. 3, 2023

(65) Prior Publication Data

US 2025/0145426 A1 May 8, 2025

(51) Int. Cl.
*B66C 23/70* (2006.01)

(52) U.S. Cl.
CPC .... *B66C 23/706* (2013.01); *B66C 2700/0392* (2013.01)

(58) Field of Classification Search
CPC ..... B66C 23/18; B66C 23/202; B66C 23/205; B66C 23/44; B66C 23/48; B66C 23/62; B66C 23/64; B66C 23/02; B66C 23/025; B66C 23/166; B66C 23/06; B66C 5/00; B66C 5/10; B66C 2700/03; B64D 1/22; B64D 9/00; B64C 1/22; B64F 1/322
See application file for complete search history.

(56) References Cited

U.S. PATENT DOCUMENTS

| | | | | | |
|---|---|---|---|---|---|
| 1,429,216 | A * | 9/1922 | Arwine | B66C 23/48 | 254/323 |
| 2,734,645 | A * | 2/1956 | Petersen | B64C 1/22 | 414/743 |
| 3,051,419 | A | 8/1962 | Weiland | | |
| 3,371,891 | A | 3/1968 | Brader et al. | | |
| 3,463,334 | A | 8/1969 | Blakely et al. | | |

(Continued)

FOREIGN PATENT DOCUMENTS

| | | | | |
|---|---|---|---|---|
| CN | 108423575 A * | 8/2018 | | B66C 23/62 |
| CN | 108584719 A * | 9/2018 | | B66C 23/00 |

(Continued)

*Primary Examiner* — Victoria P Augustine
*Assistant Examiner* — Henrix Soto
(74) *Attorney, Agent, or Firm* — AFMCLO/JAZ; Jeffrey V. Bamber

(57) ABSTRACT

An aircraft mounted cargo lifting crane and adapter for mounting the same. The adapter includes a plate portion and several upstanding webs extending from the plate portion. The upstanding webs include perimeter webs that protect the bolted connections to the aircraft floor, and interior webs that are configured to surround the base of a crane. The adapter further includes a plurality of foot pads that have a slotted hole passing through the same, and a plurality of retractable wheels. A crane system is provided which includes the adapter and a crane, such as a jib crane, that is joined to the adapter. The crane system can be movably joined to different attachment points on the floor of the cargo bay of an aircraft.

11 Claims, 6 Drawing Sheets

(56) References Cited

U.S. PATENT DOCUMENTS

| | | | | |
|---|---|---|---|---|
| 3,552,587 | A | 1/1971 | Warren | |
| 3,561,704 | A | 2/1971 | Schulze | |
| 4,030,353 | A * | 6/1977 | Shutt | B64D 1/22 212/278 |
| 4,186,901 | A * | 2/1980 | Shorey | B64C 1/22 14/71.3 |
| 4,508,233 | A * | 4/1985 | Helms | B66C 23/48 212/199 |
| 4,858,855 | A | 8/1989 | Dalbera | |
| 5,797,504 | A * | 8/1998 | Mangum | B66C 23/166 212/204 |
| 7,070,059 | B1 * | 7/2006 | Flowers | B66C 23/44 414/921 |
| 8,167,153 | B1 * | 5/2012 | Wattel | B66C 23/166 212/271 |
| 8,292,229 | B2 | 10/2012 | Pancotti et al. | |
| 9,802,690 | B2 | 10/2017 | Goelet et al. | |
| 9,944,503 | B2 * | 4/2018 | Winter | B66C 23/207 |
| 10,479,502 | B2 | 11/2019 | Barbieri | |
| 10,604,229 | B2 | 3/2020 | Lopez et al. | |
| 10,625,993 | B2 * | 4/2020 | Lopez Pielago | B66C 23/207 |
| 10,730,723 | B1 * | 8/2020 | Spitsbergen | B66C 23/68 |
| 11,479,335 | B2 * | 10/2022 | Koh | B64C 1/18 |
| 2007/0235403 | A1 * | 10/2007 | Ethington | B60L 50/10 212/180 |
| 2008/0245522 | A1 * | 10/2008 | Hamilton | B66C 23/16 166/77.51 |
| 2010/0111661 | A1 * | 5/2010 | Svanda | B66C 23/706 414/543 |
| 2016/0107753 | A1 * | 4/2016 | Toktas | B64D 11/0696 244/119 |
| 2016/0289048 | A1 * | 10/2016 | Cox | B66C 23/20 |
| 2022/0193470 | A1 * | 6/2022 | Voss | E04G 3/34 |
| 2022/0220741 | A1 * | 7/2022 | Miller | E04H 12/22 |

FOREIGN PATENT DOCUMENTS

| | | | | |
|---|---|---|---|---|
| DE | 19639576 | A1 * | 4/1998 | B66C 23/025 |
| DE | 3323513 | A1 | 7/2015 | |
| EP | 1460024 | A1 * | 9/2004 | B66C 23/025 |
| JP | 2009196758 | A * | 9/2009 | |

* cited by examiner

AIRCRAFT MOUNTED CARGO LIFTING CRANE AND ADAPTER FOR MOUNTING THE SAME

RIGHTS OF THE GOVERNMENT

The invention described herein may be manufactured and used by or for the Government of the United States for all governmental purposes without the payment of any royalty.

FIELD OF THE INVENTION

The present invention relates generally to cargo lifting cranes and, more particularly, to an aircraft mounted cargo lifting crane and adapter for mounting the same.

BACKGROUND OF THE INVENTION

There is increasing interest in having U.S. Air Force aircraft more frequently be able to operate in austere, unsupported environments. This necessitates that aircraft perform a wide variety of missions, requiring a broader envelope of capabilities than that for which an aircraft was originally designed. One specific case of this employment is evident in the KC-135 refueling tanker. This aircraft has a significant cargo capacity but is only able to be loaded through the assistance of a forklift for heavier items. In austere, unsupported environments, forklifts are often not available.

Currently, any cargo lifted into the aircraft is done so through the crew entrance or the cargo door. The crew entrance is a narrow ladder through an enclosed area limiting cargo options both by size and weight. The cargo door opening provides access to hoist heavier loads into the aircraft by hand, using web straps connected to mobility bags that are pulled directly by aircrew into the aircraft. This system has the potential to cause injury to the personnel as well as damage to the aircraft as cargo is lifted adjacent to the fuselage. Using this technique, the crew is again limited by shape and weight of the cargo, unable to lift more than about 50 lbs. in this way.

Therefore, a need exists for an improved system and method of loading heavier cargo onto an aircraft in austere, unsupported environments.

SUMMARY OF THE INVENTION

The present invention relates generally to cargo lifting cranes and, more particularly, to an aircraft mounted cargo lifting crane and adapter for mounting the same.

While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, an adapter for movably joining a crane which has a base to the floor of an aircraft is provided. The adapter has an upwardly-facing side and an opposed floor-facing side. The adapter may comprise:

- a plate portion having a first surface facing the same direction as the upwardly-facing side of the adapter, a second surface facing the same direction as the floor-facing side of the adapter, a perimeter, and a thickness;
- a plurality of upstanding webs joined to the first surface of the plate portion, said upstanding webs comprising:
  - perimeter webs disposed adjacent to the perimeter of the plate portion;
  - interior webs sized and configured to surround the base of a crane; and
- a plurality of foot pads joined to the second surface of the plate portion, said foot pads comprising protrusions extending outwardly from said second surface of said plate portion, wherein said foot pads and said second surface of said plate portion to which said foot pads are joined have a slotted hole passing therethrough; and
- a plurality of wheels/rollers joined to at least one of said plate portion or said perimeter webs, wherein said wheels have a deployed position and a retracted position.

A crane system for use in an aircraft is also provided. The crane system enables the transfer of a load from outside the aircraft into the aircraft and vice versa. The crane system comprises:

- an adapter such as that described above for movably joining a crane to the floor of an aircraft; and
- a jib crane comprising a jib arm joined to a main support, said main support having a base that is joined to said adapter, wherein said jib arm is spaced away from the base of said crane.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity of illustration.

DETAILED DESCRIPTION OF THE INVENTION

The present invention relates generally to cargo lifting cranes and, more particularly, to an aircraft mounted cargo lifting crane and adapter for mounting the same.

Figure 1:
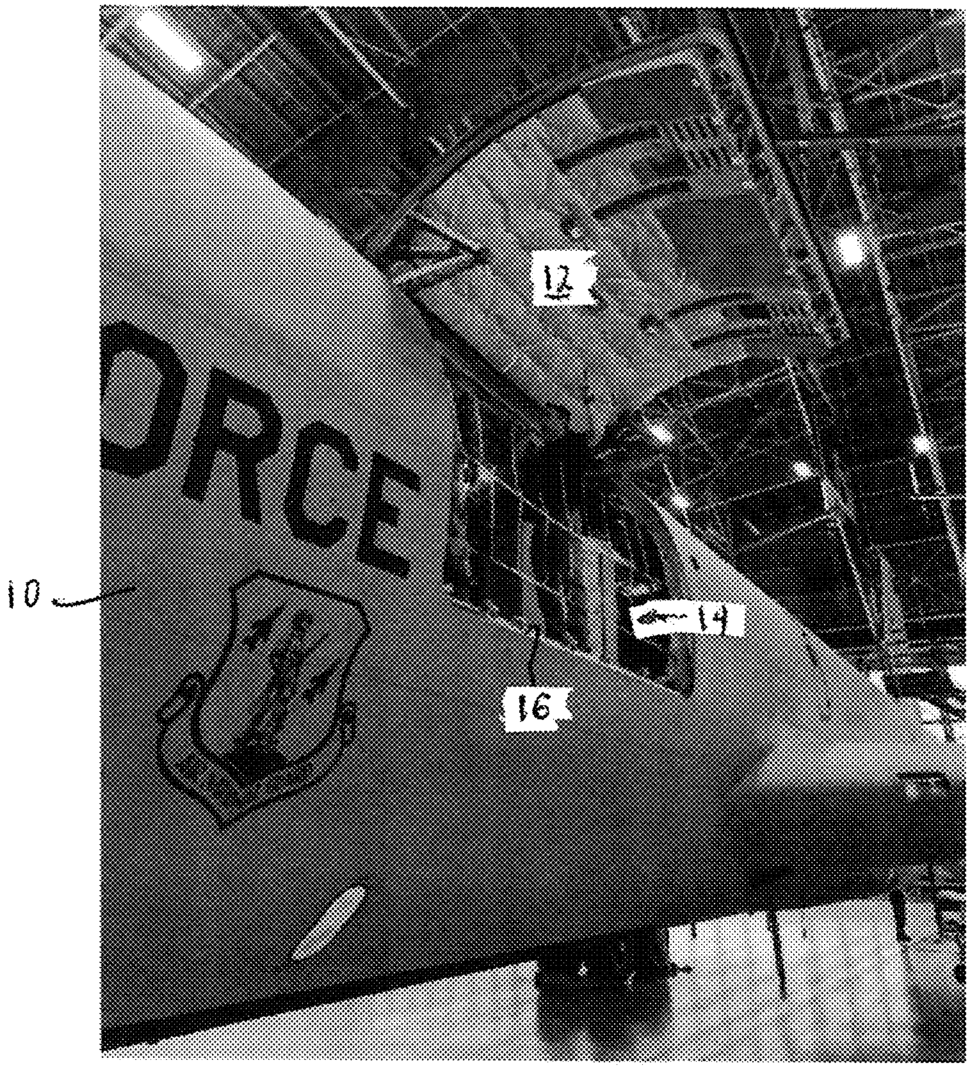
FIG. 1 is a perspective view of a portion of a KC-135 refueling tanker with its cargo door open.
Figure 2:
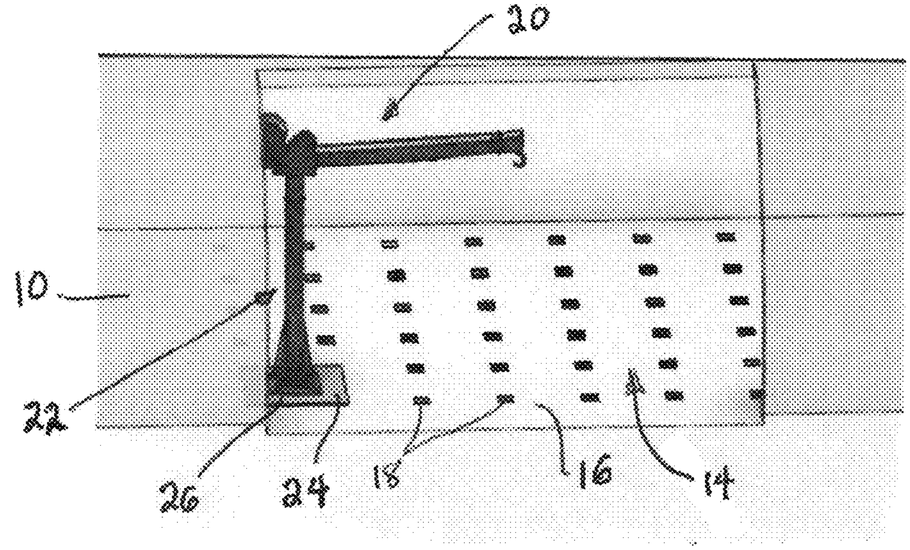
FIG. 2 is a schematic perspective view of a crane system mounted in the cargo bay of an aircraft.

FIG. 1 shows a portion of an aircraft 10 with its cargo door 12 open. The aircraft 10 has a cargo bay 14 with a floor 16. FIG. 2 shows that the floor 16 is provided with a plurality of cargo attachment points (or floor brackets) 18. The aircraft 10 can be any suitable aircraft. In one non-limiting embodiment, the aircraft 10 is a KC-135 refueling tanker.

FIG. 2 shows one embodiment of a crane system 20 mounted to the floor 16 of the cargo bay 14 of the aircraft. The system comprises a commercially available crane 22 that is attached to a custom designed adapter (or "base-plate") 24, which can be installed on the existing cargo floor brackets 18 of the aircraft 10. The attachment points 18 are typically distributed uniformly across the floor 16 of the entire cargo bay 14. This pattern of attachment points 18 allows the crane 22 to be positioned in a variety of locations near the cargo door 12 when in use, and then collapsed and stored securely in a convenient location when not in use.

Figure 4:
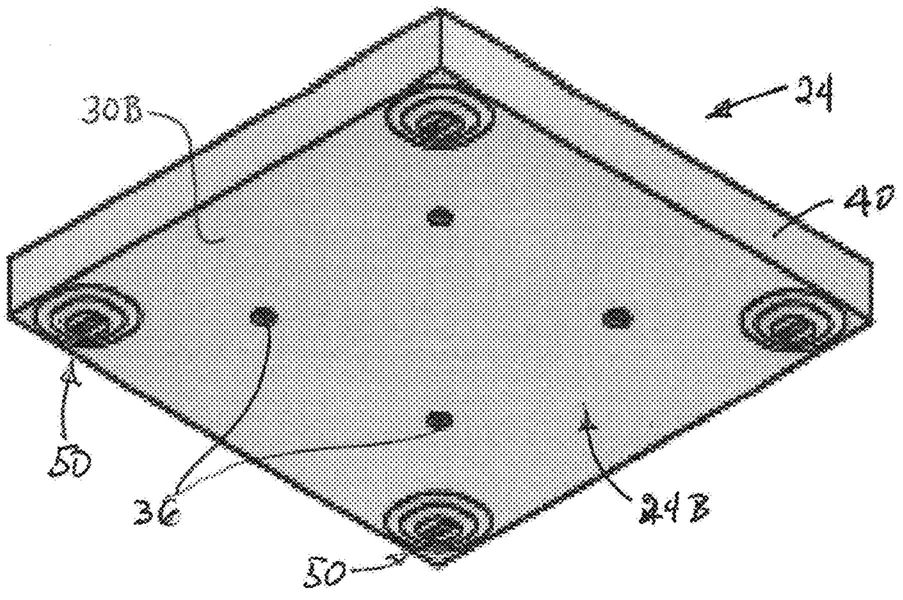
FIG. 4 is a bottom perspective view of the adapter shown in FIG. 3.
Figure 5:
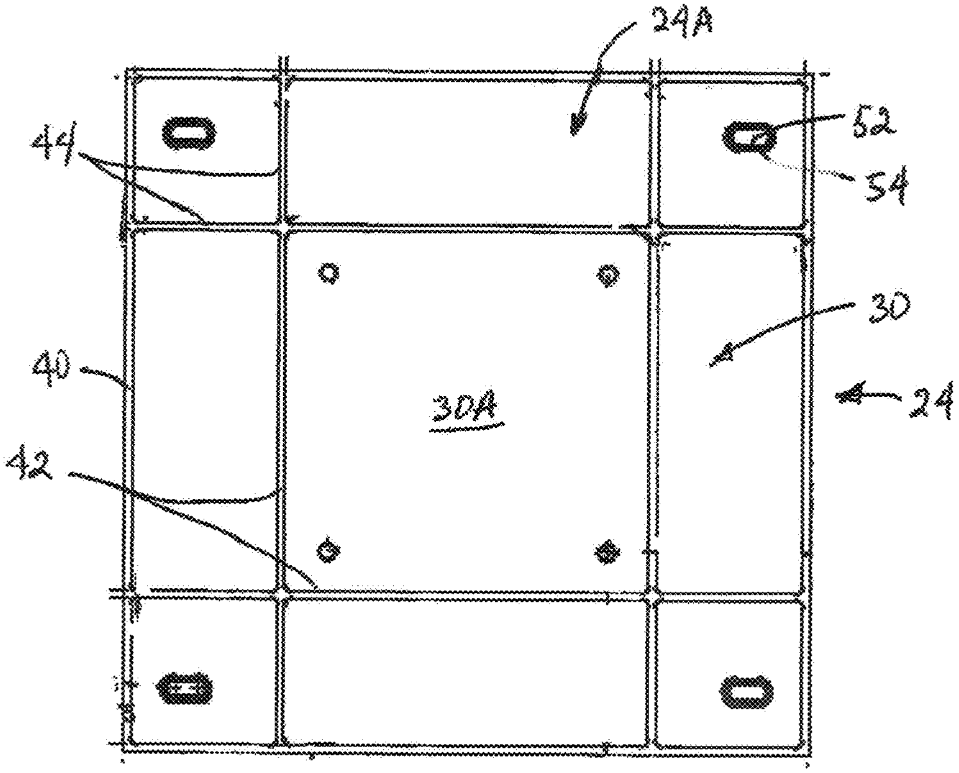
FIG. 5 is a top plan view of the adapter shown in FIG. 3.
Figure 6:
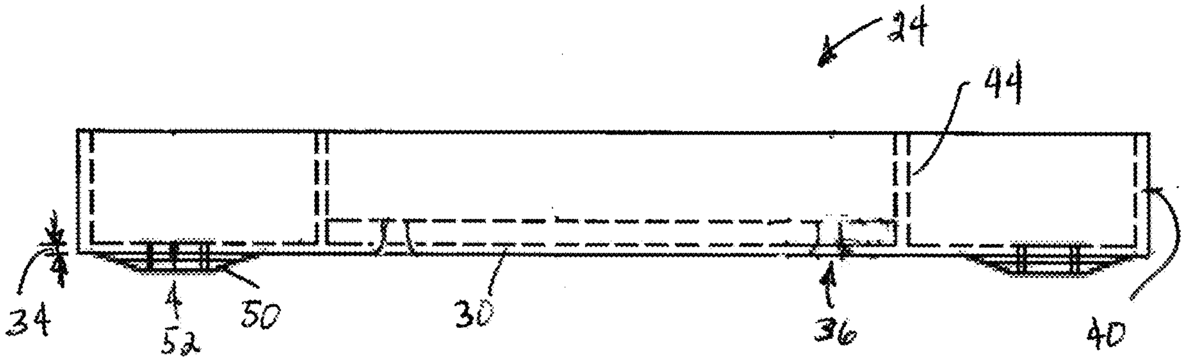
FIG. 6 is a front view of the adapter shown in FIG. 3.
Figure 7:
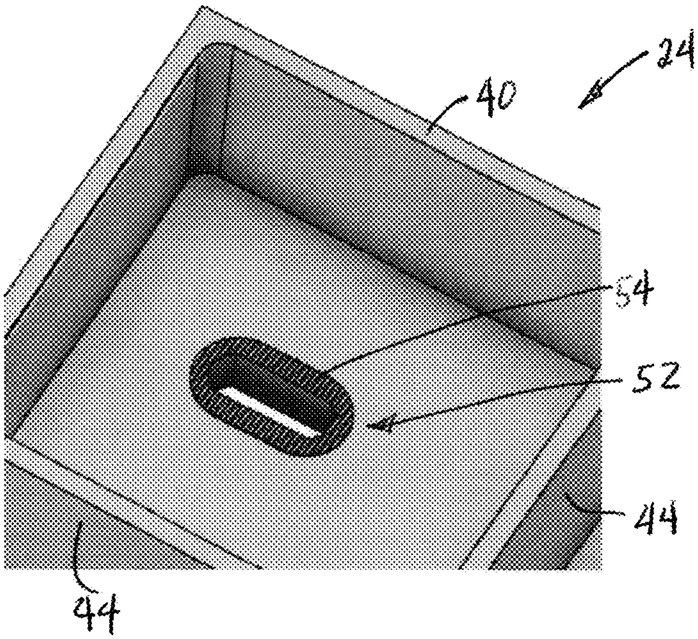
FIG. 7 is a top perspective view of a portion of the adapter shown in FIG. 3.

FIGS. 3-6 show the adapter 24 in greater detail. The adapter 24 is used for movably joining a crane 22 having a base 26 to the floor of an aircraft. The adapter 24 has an upwardly-facing side 24A and an opposed floor-facing side 24B. The adapter 24 comprises: a plate portion 30 having a first surface 30A facing the same direction as the upwardly-facing side 24A of the adapter, a second surface 30B facing the same direction as the floor-facing side 24B of the adapter, a perimeter 32, and a thickness 34 (the latter being shown in FIG. 6). As shown in FIG. 6, the plate portion 30 may have some portions that are thicker than other portions. The plate portion 30 may have a plurality of through holes 36 in the central portion of the same for mounting the base 26 of a crane 22 thereto. The central portion of the plate portion 30 with the through holes 36 therein may be thicker than the parts of the plate portion that are located outside of the central portion.

Figure 3:
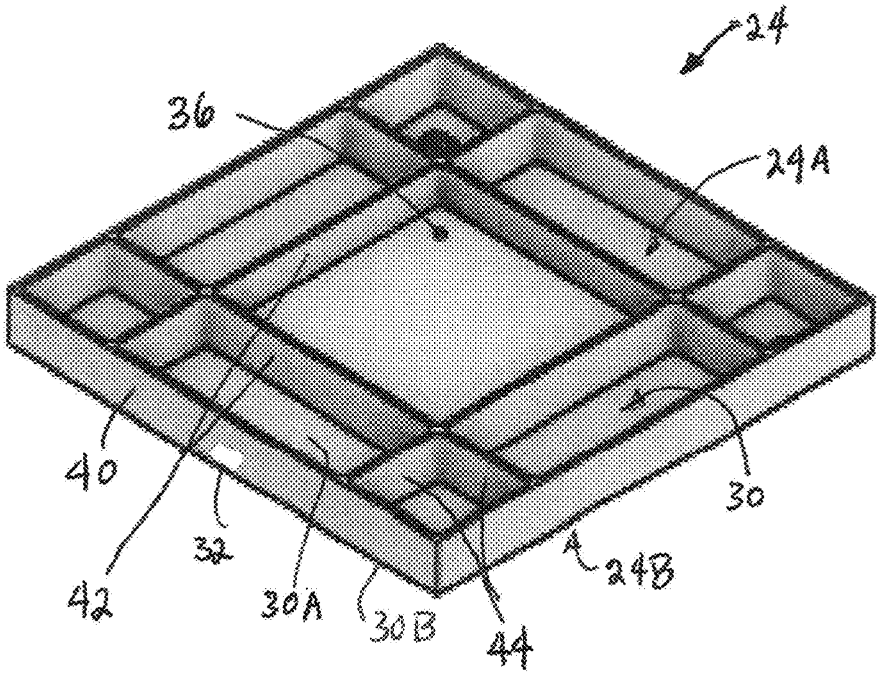
FIG. 3 is a top perspective view of an adapter for movably joining a crane to the floor of an aircraft.

FIG. 3 shows that the adapter 24 comprises a plurality of upstanding webs that are joined to the plate portion 30. In the embodiment shown, the upstanding webs are perpendicular to the first surface 30A of the plate portion 30. The upstanding webs comprise: perimeter webs 40 disposed adjacent to the perimeter 32 of the plate portion 30; central interior webs 42 that are sized and configured to surround the base 26 of a crane 22; and a plurality of connecting interior webs 44 that are sized and configured to join the central interior webs 42 to the perimeter webs 40. The perimeter webs 40 of the adapter 24 contribute to the safety by providing a physical barrier to accidental damage to the bolted connections that are described in further detail below. This damage could result in a bolt sheer failure or the crane to fall, which is a safety risk in an aerial tanker. The upstanding webs also enable efficient storage of the battery, which may be at least one power source for the crane 22. The battery may be provided with a custom 3D printed mount which secures the battery from shifting or accidental damage.

FIG. 4 shows that the adapter 24 further comprises a plurality of foot pads 50 joined to the second surface 30B of the plate portion 30. The foot pads 50 comprise protrusions that extending outwardly from the second surface 30B of the plate portion 30. The foot pads 50 may be configured in the form of a two-stage chamfer stand-off from the second surface 30B of the plate portion 30. The foot pads 50 provide extra standoff distance, allowing the adapter 24 to rest directly on the metal cargo attachment points 18, to eliminate contact with the easily damaged plywood floor of the aircraft. The foot pads 50 also distribute the stress from crane 22 through the relatively thin adapter 24 webs and into the cargo attachment points 18 without creating stress concentrations. This allows the adapter 24 to maintain a factor of safety over 3, while keeping the adapter 24 light and movable.

The foot pads 50 and the portions of the second surface 30B of the plate portion 30 to which the foot pads 50 are joined have a slotted hole 52 passing therethrough. As shown in FIGS. 4 and 5, the slotted holes 52 in the foot pads 50 may all have a longer dimension that is oriented in the same direction. Opposite the foot pads 50, serrated racetrack shaped washers 54 are positioned around each of the slotted holes 52 on the first surface 30A of the plate portion 30. The slotted holes 52 along with the serrated washers 54 allow the crane 22 (which is joined to the adapter 24) to be placed above the cargo attachment points 18, and attached via bolts. Although the bolt heads need to move laterally to slide into the cargo floor attachment points 18, the crane 22 does not need to be adjusted due to the slotted bolt holes 52. The serrated washers keep the adapter 24 from shifting once the bolts are under tension.

Figure 9:
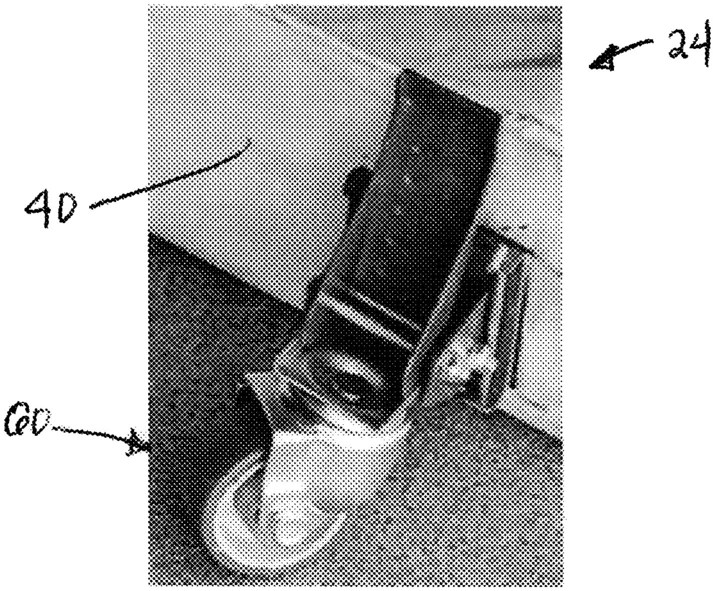
FIG. 9 is a perspective view of a portion of the adapter showing one of the casters joined thereto.

The adapter 24 may also comprise a plurality of wheels 60 that are joined to at least one of the plate portion 30 or the perimeter webs 40 of the adapter 24. The wheels 60 may comprise rollers or casters. In one embodiment, the adapter 24 comprises four heavy-duty caster wheels 60 (one of which is shown in FIG. 9), which allow it to be moved and installed within the aircraft by a single person. The wheels 60 have a deployed position and a retracted position. As shown in FIG. 9, the caster wheels 60 can each be deployed with the press of a foot. This allows the crane's weight to be carried by the wheels 60, and a single person can relocate and/or stow the crane system 20.

The adapter 24 can be made from any suitable material(s), and in any suitable manner. Suitable materials include, but are not limited to aluminum and stainless steel. Suitable methods of making the adapter 24 include, but are not limited to welding plates together, and machining the adapter from a block of material. In one case, the adapter 24 can be made using a CNC machine to cut an aluminum billet to the desired specifications. Following CNC machining, additional material may be welded onto the adapter 24 to accommodate wheel mounting.

The crane 22 can be any suitable type of crane. In one non-limiting embodiment, the crane 22 is a jib crane. The jib crane has a base and a mast or main support extending upward from the base. A boom or jib arm is mounted adjacent the top of the mast. The crane 22 uses an electric motor to raise and lower a winch located at the end of the boom. The electric motor can be designed to operate on AC or DC power. This design flexibility allows the crane 22 to be powered by a stand-alone battery or by ground or aircraft power. In one embodiment, the crane 22 can rotate 360 degrees around its vertical axis, extend the crane boom between 39 to 63 inches, and adjust the boom angle from horizontal to 55 degrees high, as well as fold down vertically when not in use. Depending on the extension length and boom angle, in some cases, the crane 22 may be capable of lifting from 250 pounds, or less, up to 2000 pounds or more.

Figure 8:
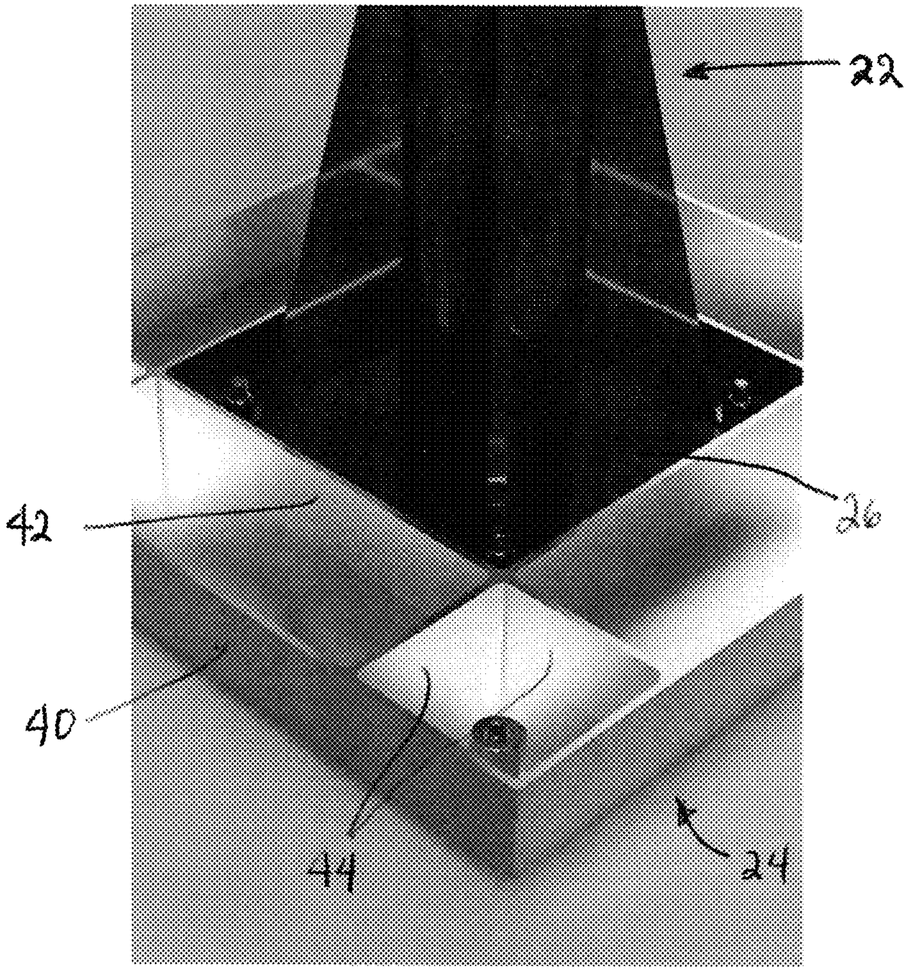
FIG. 8 is a perspective view of a portion of the adapter showing the base of a crane joined to the adapter.

The crane system 22 and the adapter 24 can be used in any suitable manner. Typically, the base 26 of the crane 22 will be joined to the first surface 30A of the plate portion 30 of the adapter 24 using bolts which pass upwardly through the holes 36 in the plate portion to form the crane system 20 as shown in FIG. 8. Then, the crane system 20 is placed above the desired cargo attachment points 18, and attached via bolts that pass upward through the slotted holes 52 in the foot pads 50 which are secured by nuts. These bolts and nuts may comprise the existing aircraft cargo attachment hardware.

The crane system 20 can be used as a cargo lifting option for the crew, stored on-aircraft, and employed in areas where forklift, k-loaders, and other lifting vehicles are unavailable or unresponsive to an urgent need. The system will be moved, installed, and operated, and stowed by the aircrew.

There are numerous, non-limiting embodiments of the invention. All embodiments, even if they are only described as being "embodiments" of the invention, are intended to be non-limiting (that is, there may be other embodiments in addition to these), unless they are expressly described as limiting the scope of the invention. Any of the embodiments described herein can also be combined with any other embodiments in any manner to form still other embodiments.

Although the embodiment shown in the drawings is made specifically for the KC-135, slight modifications to the shape and design of the adapter 24 could accommodate usage on any aircraft with a uniform cargo attachment pattern on its floor, allowing universal usage and expanding the boundaries of cargo lift capabilities of many aircraft.

The material of the adapter 24 is specifically chosen for its material properties, availability, and machinability. The commercially available crane could be substituted with other designs or manufacturers, while accommodating for the weight capacity, boom length, and attachment footprint.

The aircraft mounted cargo lifting crane and adapter for mounting the same described herein can provide a number of advantages. It should be understood, however, that these advantages need not be required unless they are set forth in the appended claims.

The aircraft mounted cargo lifting crane allows aircrew to lift heavy cargo into the cargo door of an aircraft without the assistance of a forklift enabling missions such as medical evacuations, wet wing refueling, and mid-weight cargo loading. Furthermore, the crane system design includes wheels for easy mobility within the aircraft, a flexible power source, and a custom designed base plate that facilitates on-aircraft usage and storage capability allowing the crane to be secured to existing cargo attachment points. The crane system in a convenient configuration can lift 600 pounds into the aircraft, while securely holding the cargo away from the fuselage, and allowing the cargo to rotate into the cargo door once adequate height is achieved. This solves the day-to-day problems of lifting crew equipment, as well as creates the capability to expand the mission set of the KC-135 for heavier, critical items or injured people.

As used herein, an element or step recited in the singular and preceded with the word "a" or "an" should be understood as including the plural of such elements or steps, unless the plural of such elements or steps is specifically excluded.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An adapter for movably joining a crane which has a base to a floor of a cargo bay of an aircraft, which floor is comprised of wood overlaid on metal support structure and has a plurality of spaced apart metal cargo attachment points thereon, wherein said cargo attachment points are arranged in a pattern of rows and columns on said floor, said adapter having an upwardly-facing side and an opposed floor-facing side, said adapter comprising:

a plate portion having a first surface facing the same direction as the upwardly-facing side of the adapter, a second surface facing the same direction as the floor-facing side of the adapter, a length, a width, a perimeter, and a thickness;

a plurality of upstanding webs joined to the first surface of the plate portion, said upstanding webs comprising:

perimeter webs disposed adjacent to the perimeter of the plate portion; and interior webs sized and configured to surround the base of the crane;

a plurality of discrete foot pads joined to the second surface of the plate portion, said foot pads comprising protrusions extending outwardly from said second surface of said plate portion, wherein said foot pads are sized and configured to fit into said metal cargo attachment points, wherein each of said foot pads and said second surface of said plate portion to which said foot pads are joined have a slotted hole passing therethrough, wherein said adapter is configured to be joined at said foot pads to said metal cargo attachment points; and a plurality of wheels joined to at least one of said plate portion or said perimeter webs, wherein said wheels have a deployed position and a retracted position.

2. The adapter of claim 1 wherein said plate portion is a flat piece of material, and said foot pads have a length and width that are each several times smaller than the length and width of the plate portion.

3. The adapter of claim 1 wherein said foot pads are configured to have a two-stage chamfer stand-off from the second surface of said plate portion.

4. The adapter of claim 1 wherein said plate portion is rectangular, and said plate portion has four corners, and said plurality of foot pads comprises four foot pads, wherein a foot pad is located adjacent each corner of said plate portion.

5. The adapter of claim 1 wherein said slotted holes are sized and configured for receiving a bolt for attachment of cargo floor attachment points on the aircraft.

6. The adapter of claim 5 wherein said slotted holes define a racetrack-shaped opening having a length and a width.

7. The adapter of claim 6 wherein said slotted holes are oriented so that their lengths all extend in the same direction.

8. The adapter of claim 1 further comprising a serrated racetrack shaped washer positioned around each of the slotted holes.

9. The adapter of claim 1 wherein the plate portion is sized and configured so that the plate portion does not extend appreciably beyond an area that covers four metal cargo attachment points that are closest to each other and that form the corners of a square on the floor of the cargo bay of the aircraft.

10. A crane system for use in an aircraft, the crane system enabling the transfer of a load from outside the aircraft into the aircraft and vice versa, said crane system comprising:

the adapter according to claim 1 for movably joining the crane to the floor of the aircraft; and a jib crane comprising a jib arm joined to a main support, said main support having a base that is joined to said adapter, wherein said jib arm is spaced away from the base of said crane.

11. An adapter for movably joining a crane which has a base to a floor of a cargo bay of an aircraft, which floor is comprised of wood overlaid on metal support structure and has a plurality of spaced apart metal cargo attachment points thereon, wherein said cargo attachment points are arranged in a pattern of rows and columns on said floor, said adapter having an upwardly-facing side and an opposed floor-facing side, said adapter comprising:

a plate portion comprising a flat rectangular piece of material having a first surface facing the same direction as the upwardly-facing side of the adapter, a second surface facing the same direction as the floor-facing side of the adapter, four corners, a length, a width, a perimeter, and a thickness;

a plurality of upstanding webs joined to the first surface of the plate portion, said upstanding webs comprising:

perimeter webs disposed adjacent to the perimeter of the plate portion; and interior webs sized and configured to surround the base of the crane;

four discrete foot pads joined to the second surface of the plate portion, said foot pads comprising protrusions extending outwardly from said second surface of said plate portion, wherein a foot pad is located adjacent each corner of said plate portion, wherein said foot pads have a length and width that are each several times smaller than the length and width of the plate portion, and said foot pads are sized and configured to fit into said metal cargo attachment points, wherein said foot pads are configured to have a two-stage chamfer stand-off from the second surface of said plate portion, and wherein each of said foot pads and said second surface of said plate portion to which said foot pads are joined have a slotted hole passing therethrough, wherein said slotted holes define a racetrack-shaped opening having a length and a width that is sized and configured for receiving a bolt for attachment of cargo floor attachment points on the aircraft, wherein said slotted holes are oriented so that their lengths all extend in the same direction, and wherein said adapter is configured to be joined at said foot pads to said metal cargo attachment points; and a plurality of wheels joined to at least one of said plate portion or said perimeter webs, wherein said wheels have a deployed position and a retracted position.

* * * * *